June 24, 1958   H. M. KNIGHT   2,839,984
TRASH SPRING MEMBER
Filed June 23, 1955
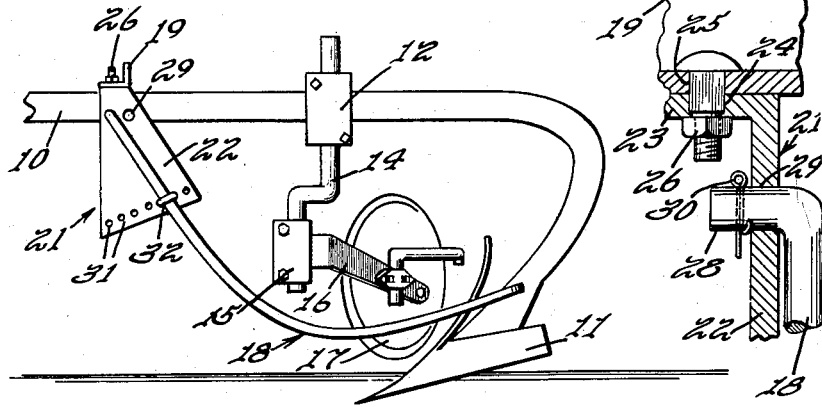
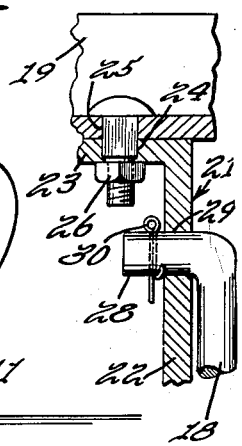
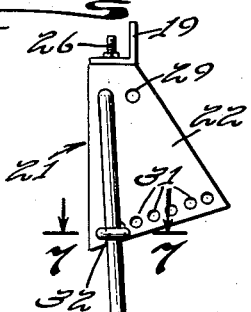
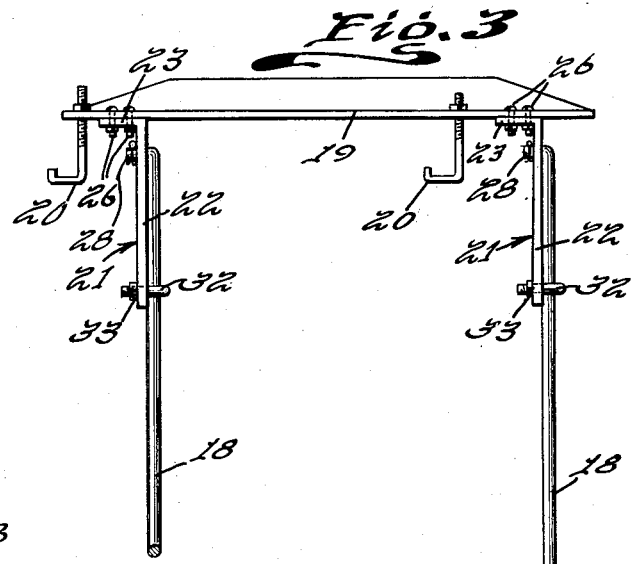
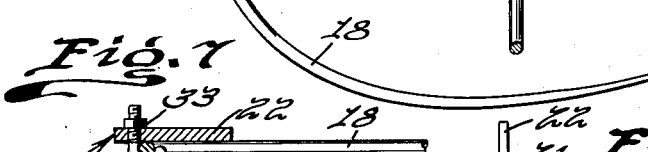
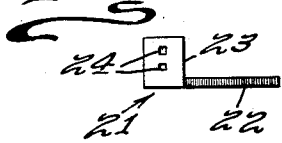
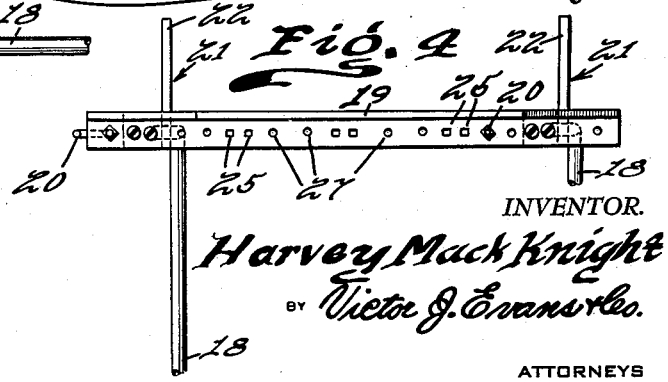
INVENTOR.
Harvey Mack Knight
BY Victor J. Evans & Co.
ATTORNEYS a plate portion 22, and an upper horizontally disposed flange 23. The flange 23

2,839,984

TRASH SPRING MEMBER

Harvey Mack Knight, Virginia, Ill.

Application June 23, 1955, Serial No. 517,580

3 Claims. (Cl. 97—193)

This invention relates to agricultural equipment, and more particularly to a spring member for coaction with a plow coulter.

The object of the invention is to provide a spring member for a plow coulter whereby trash, weeds and the like wil be firmly pressed down so that the plow coulter will more readily cut the trash or weeds without clogging.

Another object of the invention is to provide spring members for coaction with plow coulters whereby trash, weeds, or the like will be conveniently pressed down in the path of the coulter so that the trash or weeds can be more efficiently cut and whereby the attachment of the present invention can be mounted on plows of different shapes and sizes, and wherein the spring members can be readily adjusted or moved out of the way, when desired.

A further object of the invention is to provide spring members for pressing down trash or weeds, which are extremely simple and inexpensive to manufacture.

Other objects and advantages will be apparent during the course of the following description.

In the accompanying drawings, forming a part of this application, and in which like numerals are used to designate like parts throughout the same:

Figure 1 is a fragmentary side elevational view illustrating the trash spring of the present invention in use.

Figure 2 is a side elevational view of one of the spring members and showing its mounting bracket.

Figure 3 is a view taken at right angles to the view shown in Figure 2.

Figure 4 is a fragmentary plan view of the assembly shown in Figure 3.

Figure 5 is a plan view of one of the mounting brackets.

Figure 6 is a fragmentary sectional view illustrating the connection of the spring member to the mounting bracket.

Figure 7 is a sectional view taken on the line 7—7 of Figure 2.

Referring in detail to the drawings, the numeral 10 designates a beam which has a plow 11 on its lower rear end, Figure 1. There may be provided a plurality of the beams 10, and clamps 12 are mounted on the beams 10, there being a shank 14 depending from each clamp 12. A support member 15 may be secured to the lower end of each shank 14, and an arm 16 extends rearwardly from the support member 15, the arm 16 having a conventional plow coulter or disc 17 connected thereto.

The present invention is directed to a spring member 18 which serves to press down weeds, trash, or the like so that such material can be readily cut by the coulter 17. A mounting means is provided for connecting the spring member 18 to the beam 10, and this means comprises a horizontally disposed bar 19 which has a plurality of bolts 20 depending therefrom. The bolts 20 may have a J-shape, and these bolts 20 are adapted to engage the beams 10.

There are further provided brackets 21 which each include a vertically disposed plate portion 22, and an upper horizontally disposed flange 23. The flange 23 is provided with openings 24 which register with openings 25 in the bar 19, and suitable securing elements such as bolt and nut assemblies 26 extend through the registering openings 24 and 25 for connecting the brackets 21 to the bar 19. The bar 19 is further provided with openings 27 whereby the bolts 20 can be extended through any of the openings 27 so as to permit the bar 19 to be mounted on beams 10 of different sizes or widths.

The upper end of the spring member 18 is shaped to provide a transverse finger 28, and the finger 28 is adapted to extend through one of a plurality of upper openings 29 which are formed in the plate portion 22 of the bracket 21. A suitable securing element such as a cotter pin 30 is provided for retaining the finger 28 in its respective opening 29. There is further provided in the plate portion 22 a plurality of lower openings 31, and a bolt 32 extends through one of the openings 31 for maintaining the spring member 18 immobile in its various adjusted positions. The bolt 32 may have a substantially L-shape as shown in Figure 7, and a nut 33 may be arranged in engagement with the bolt 32 for retaining the parts in their proper assembled position.

From the foregoing, it is apparent that there has been provided a spring assembly which will facilitate the cutting of weeds, trash, or the like. In use, the assembly shown in Figures 3 and 4 may be attached to a pair of the beams 10 by means of the J-bolts 20. Thus, the bar 19 will extend transversely across the tops of the beams 10. The brackets 21 can be secured to the bar 19 through the medium of the bolt and nut assemblies 26. Due to the provision of the plurality of spaced apart openings 25 and 27, the bolts 20, and the brackets 21 can be shifted to different adjusted positions on the bar 19 whereby the device can be mounted on implements wherein the beams 10 are at different relative positions with respect to each other. Connected adjustably to each of the brackets 21 is the curved spring member 18, and the upper transverse finger 28 of each spring member projects through one of the openings 29 in the plate portion 22 of the bracket 21, and the cotter pin 30 retains the finger 28 in its adjusted position. The bolt 32 has a portion extending through one of the openings 31, whereby the spring member 18 is further retained in its adjusted position. As shown in Figure 1, the rear portion of the spring member 18 is arranged contiguous to the coulter or disc 17 so that the trash, weeds, or the like will be pressed down by the spring member 18 whereby the disc 17 can more easily cut or sever such weeds or trash.

The device of the present invention is especially suitable for use on tractor breaking plows whereby trash, litter and the like will be firmly pressed down in front of the plow coulter 17 so that the plow coulter can cut the trash and litter without clogging. The spring member 18 can be made of spring steel, and due to the provision of the plurality of openings 29 and 31, the spring can be set to different adjusted positions. The device is non-clogging and the spring member 18 operates on one side only of the plow coulter 17 whereby the spring member 18 can move away and up from the plow coulter when desired. The spring is not connected to the coulter so that there will be no possibility of clogging by stalks, trash and the like which is advantageous. The device can be used on breaking plows with short beams, of the quick hitch carrying type. The spring 18 has a curved or crescent shape. The tension of the spring 18 can be varied as desired due to the provision of the plurality of openings 29 and 31. Further, the device can be mounted on a plow quickly and can also be readily removed from the plow when desired.

I claim:

1. In a press for plow coulters, a horizontally disposed bar provided with a plurality of openings therein, a pair of J-shaped bolts depending from said bar, a pair of brackets each including a horizontally disposed upper flange adjustably connected to said bar, each of said brackets further including a vertically disposed plate portion provided with uper and lower sets of openings, curved spring members each including an upper transverse finger projecting through an upper opening in said plate portion, a securing element extending through said finger, and a bolt extending through a lower opening in said plate portion and engaging said spring member.

2. The structure as defined in claim 1, wherein said spring member further includes a portion arranged contiguous to the plow coulter for pressing down weeds, trash and the like to be cut.

3. In combination, a beam having a plow on its rear end, clamps mounted on said beam, a shank depending from each of said clamps, a support member secured to the lower end of each shank, an arm extending rearwardly from said support member, a plow coulter disc connected to said arm, a horizontally disposed bar provided with a plurality of openings therein, a J-shaped bolt depending from said bar and engaging said beam, a pair of brackets each including an upper horizontally disposed flange provided with openings registering with the openings in said bar, said brackets being adjustably connected to said bar, each of said brackets further including a vertically disposed plate portion provided with upper and lower sets of openings, curved spring members each including an upper transverse finger projecting through one of a plurality of upper openings in said plate portion, a securing element through said finger, said plate portion being further provided with a plurality of lower openings, a bolt extending through a lower opening in said plate portion and engaging said spring member, said last named bolt having a substantial L-shape, said spring member further including a portion arranged contiguous to the plow coulter disc for pressing down weeds, trash and the like to be cut, said spring member adapted to be adjusted to different positions, said spring member operating on one side only of the plow coulter disc whereby the spring member can move away and up from the plow coulter when desired.

References Cited in the file of this patent

UNITED STATES PATENTS

| | | |
|---|---|---|
| 19,909 | Brinly | Apr. 13, 1858 |
| 224,223 | Price | Feb. 3, 1880 |
| 469,581 | Miller | Feb. 23, 1892 |
| 517,227 | Maine | Mar. 27, 1894 |
| 644,375 | Steffes | Feb. 27, 1900 |
| 2,124,128 | Strandlund | July 19, 1938 |
| 2,487,609 | Sparks | Nov. 8, 1949 |